(12) United States Patent
Nedzlek et al.

(10) Patent No.: US 8,282,319 B2
(45) Date of Patent: Oct. 9, 2012

(54) MATERIAL REMOVAL TOOL WITH NOISE REDUCTION FEATURES

(75) Inventors: Kevin Nedzlek, Howell, MI (US);
Yevgeny Kocherovsky, West Bloomfield, MI (US)

(73) Assignee: Valenite LLC, Madison Heights, MI (US)

( * ) Notice: Subject to any disclaimer, the term of this patent is extended or adjusted under 35 U.S.C. 154(b) by 484 days.

(21) Appl. No.: 12/640,683

(22) Filed: Dec. 17, 2009

(65) Prior Publication Data
US 2010/0183382 A1   Jul. 22, 2010

Related U.S. Application Data

(60) Provisional application No. 61/139,102, filed on Dec. 19, 2008.

(51) Int. Cl.
*B23C 5/20* (2006.01)
*B23C 27/00* (2006.01)

(52) U.S. Cl. ............................................ 407/52; 407/67
(58) Field of Classification Search ............... 407/51, 407/52, 66, 67, 100, 103, 120; 409/135, 409/136; 82/900
See application file for complete search history.

(56) References Cited

U.S. PATENT DOCUMENTS

| | | | | |
|---|---|---|---|---|
| 2,745,475 A | * | 5/1956 | Thompson et al. | 239/132.3 |
| 3,434,553 A | * | 3/1969 | Weller | 175/420.1 |
| 4,492,278 A | * | 1/1985 | Leighton | 175/420.1 |
| 6,109,377 A | * | 8/2000 | Massa et al. | 175/417 |
| 2007/0183856 A1 | * | 8/2007 | Jansson | 407/66 |

* cited by examiner

*Primary Examiner* — Will Fridie, Jr.
(74) *Attorney, Agent, or Firm* — Morgan, Lewis & Bockius LLP

(57) ABSTRACT

Rotary material removal tool mounted to a shaft for rotational motion includes a body and a plurality of radially extending arms. Each arm includes a radially outward peripheral edge, and, relative to a direction of rotational motion of the body, a leading side and a trailing side. Radially outward peripheral edges include a cutting insert mounting structure that projects axially below a bottom side of the body. The rotary material removal tool includes at least one of the following features to reduce measured air pressure ($P_1$): (i) a leading edge of the insert mounting structure includes an air-displacement structure, (ii) the radially extending arms include at least one through-opening extending from the leading side to the trailing side, and (iii) the bottom side of the body is spaced from a plane containing a bottommost surface of the projecting cutting insert mounting structure. The air-displacement structure can be generally wedge-shaped, cone-shaped or pyramid-shaped.

20 Claims, 10 Drawing Sheets

MATERIAL REMOVAL TOOL WITH NOISE REDUCTION FEATURES

RELATED APPLICATION DATA

This application claims priority under 35 U.S.C. §119(e) to U.S. Provisional Application No. 61/139,102, filed on Dec. 19, 2008, the entire contents of which are incorporated herein by reference.

FIELD

The present disclosure relates to material removal tools, and particularly to rotational cutting tools such as for milling, boring and drilling operations. The geometry and features of the disclosed material removal tools reduce the level of noise generated during operations by reducing turbulence around the rotating body of the tool and improved geometry of produced parts, particularly flatness of machined parts.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

FIGS. 1 and 2 show two views of a class of rotary tools 1 that have a truncated body 2 to satisfy the operating conditions and environments for use with an automatic tool changer of a computer numerical control (CNC) machine. The body 2 has flattened or cut sides 4 to reduce the width of the tool 1. In addition to body alteration, this class of rotary tools may have an increased number of cutting inserts 6 located in radial progression on an edge 8 to compensate for missing inserts (due to the openings in the peripheral edges) as compared to the number of inserts arranged on the entire periphery of traditional round tools.

One of the popular applications of rotary tools such as those shown in FIGS. 1 and 2 is the machining of valve bodies of transmissions. Valve bodies consist of multiple channels to direct hydraulic fluid during transmission operations. FIG. 3 is an example of a valve body. One obstacle encountered during machining of valve bodies and similar parts with truncated rotary tools, as shown, for example, in FIGS. 1 and 2, is a very high level of noise generated by the rotary tool as it approaches the valve body. This noise can, in some instances, reach about 95 dB, which is in or close to a hazardous range and above the typical 85 dB threshold for wearing hearing protection.

In addition, it has been observed that a larger area of side walls of truncated rotary tools create much higher noise levels than traditional, completely round cutters of the same outer diameter. This noise level increases with increased speed of rotation (RPM). Also, the closer the bottom face of the truncated rotary tool is positioned relative to the face of valve body the higher lever of noise generated by the truncated rotary tool.

It would be advantageous to have a rotary tool that produces reduced noise levels at operating speeds. Advantageously, such reduced noise operation would only minimally sacrifice, preferably essential not sacrifice, machining speeds and parts throughput.

SUMMARY

The disclosed rotary material removal tools generally include a cutter body geometry that reduces the level of noise during material removal operations by reducing turbulence encountered by the rotating cutter body. Some of the geometric features that can be include in the rotary material tool to, among other things, improve the displacement of air as the rotary material removal tool rotates include one or more of (i) a tapered, conical, pyramidal or similarly shaped leading edge and/or leading side of rotating portions of the cutter body, (ii) openings through rotating portions of the body, such as the arms, and (iii) increasing the distance between a bottom of the tool and a plane containing the machining surfaces of the tool.

An exemplary embodiment of a rotary material removal tool comprises a shaft having a first axis, and a body including a top side, a bottom side and a plurality of radially extending arms, the top side mounted to a first end of the shaft for rotational motion of the body about the first axis, wherein each arm includes a radially outward peripheral edge, and, relative to a direction of rotational motion of the body, a leading side and a trailing side, wherein the radially outward peripheral edge includes a cutting insert mounting structure that projects axially below the bottom side of the body, and wherein at least one of (i) a leading edge of the insert mounting structure includes an air-displacement structure, (ii) the radially extending arms include at least one through-opening extending from the leading side to the trailing side, and (iii) the bottom side of the body is spaced from a plane containing a bottommost surface of the projecting cutting insert mounting structure.

An exemplary method of machining a workpiece comprises removing material from the workpiece with a material removal tool, wherein the material removal tool includes a shaft having a first axis, and a body having a top side, a bottom side and a plurality of radially extending arms, the top side mounted to a first end of the shaft for rotational motion of the body about the first axis, wherein each arm includes a radially outward peripheral edge, and, relative to a direction of rotational motion of the body, a leading side and a trailing side, wherein a radially outward peripheral edge includes a cutting insert mounting structure that projects axially below the bottom side of the body, and wherein at least one of (i) a leading edge of the insert mounting structure includes an air-displacement structure, (ii) the radially extending arms include at least one through-opening extending from the leading side to the trailing side, and (iii) the bottom side of the body is spaced from a plane containing a bottommost surface of the projecting cutting insert mounting structure.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Figure 1:
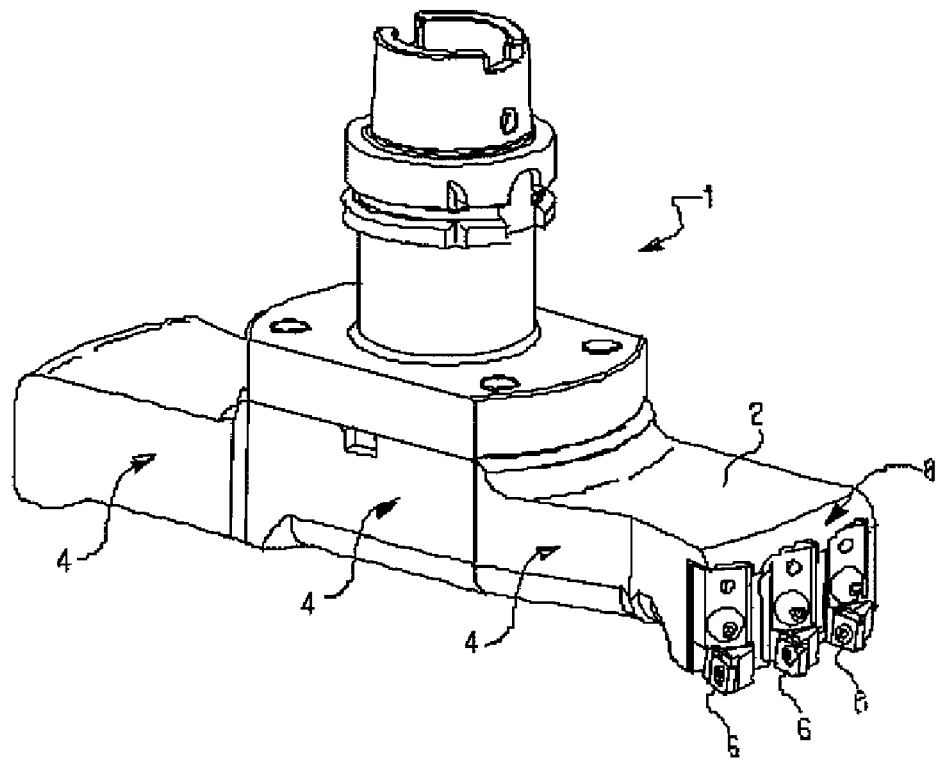
FIGS. 1 and 2 show two perspective views of a class of tools that have a truncated body.
Figure 2:
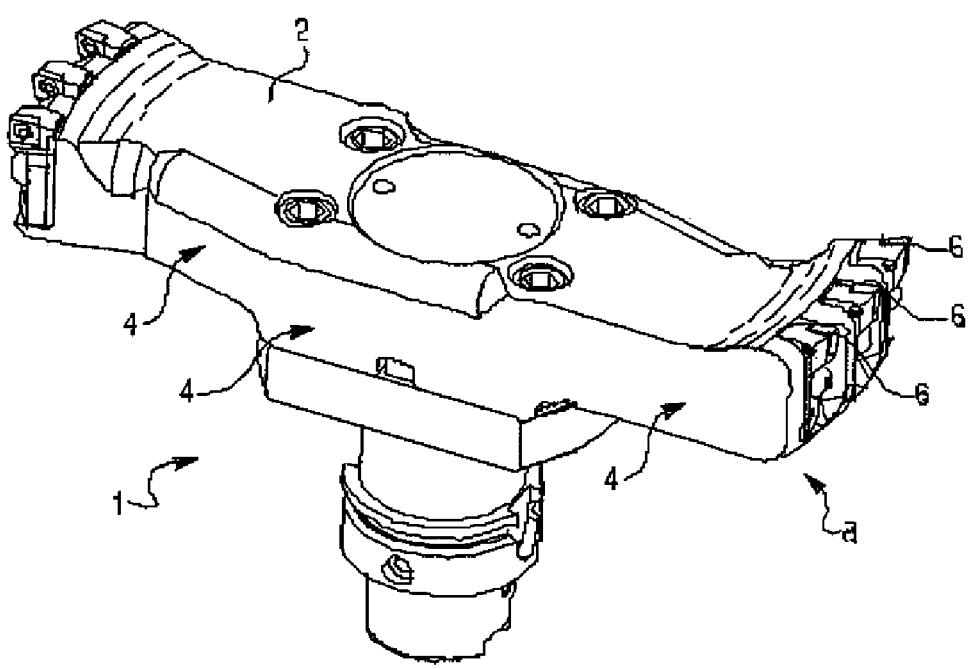
Figure 3:
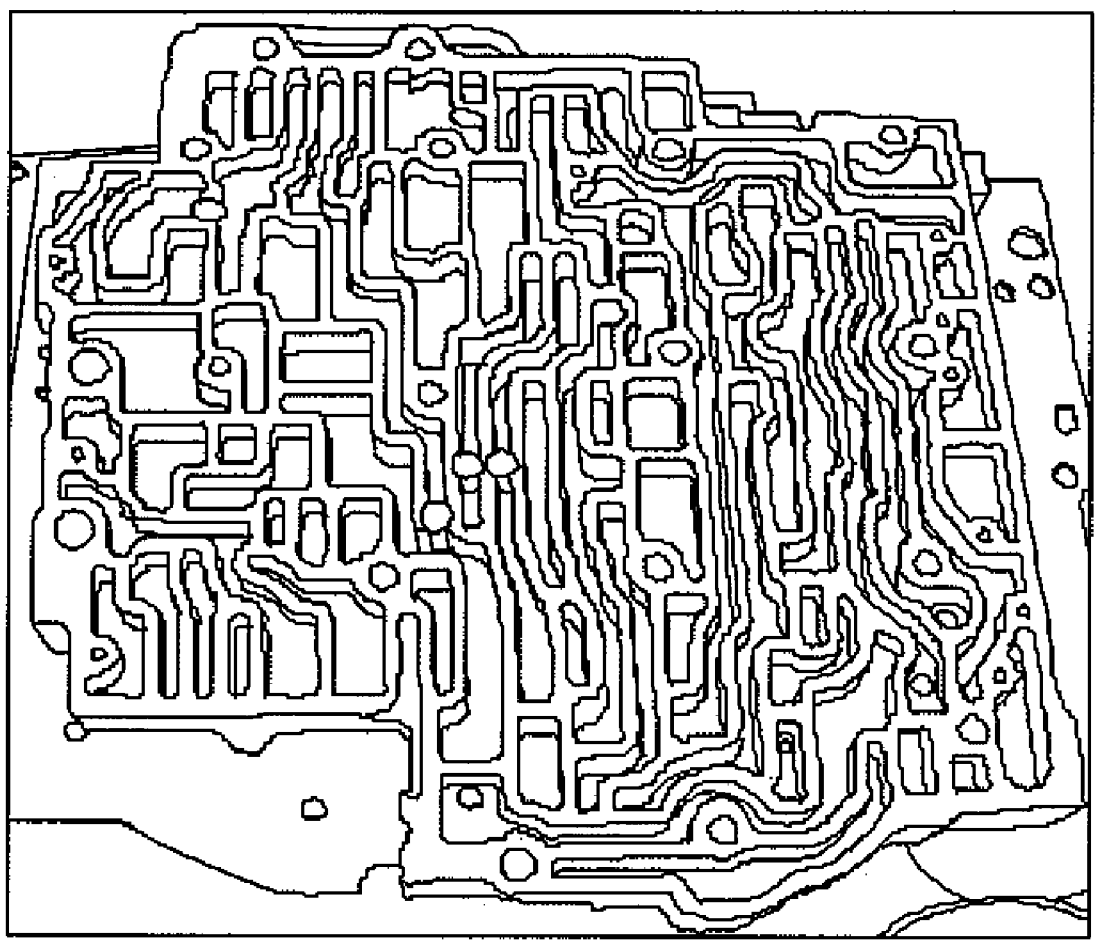
FIG. 3 shows an example of a valve body.
Figure 4:
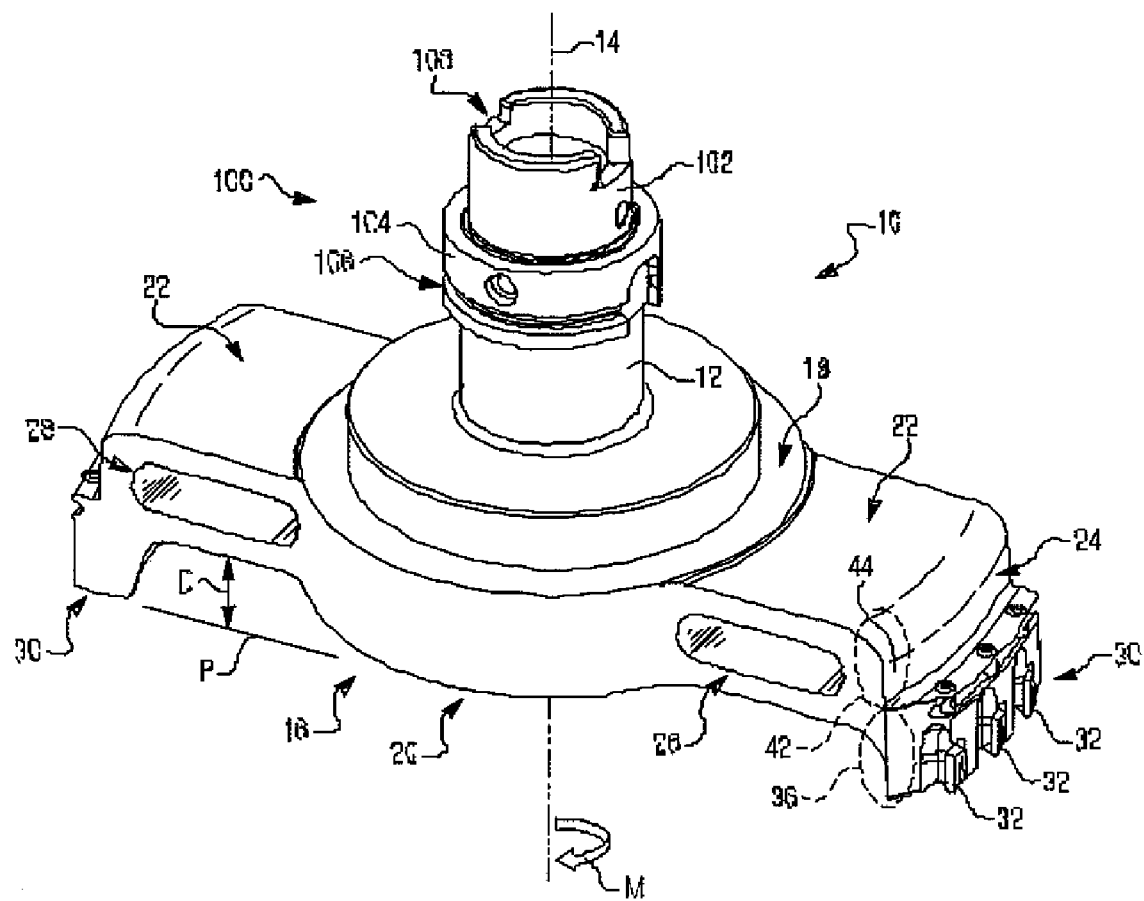
FIG. 4 shows a top perspective view of an exemplary embodiment of a rotary material removal tool.
Figure 5:
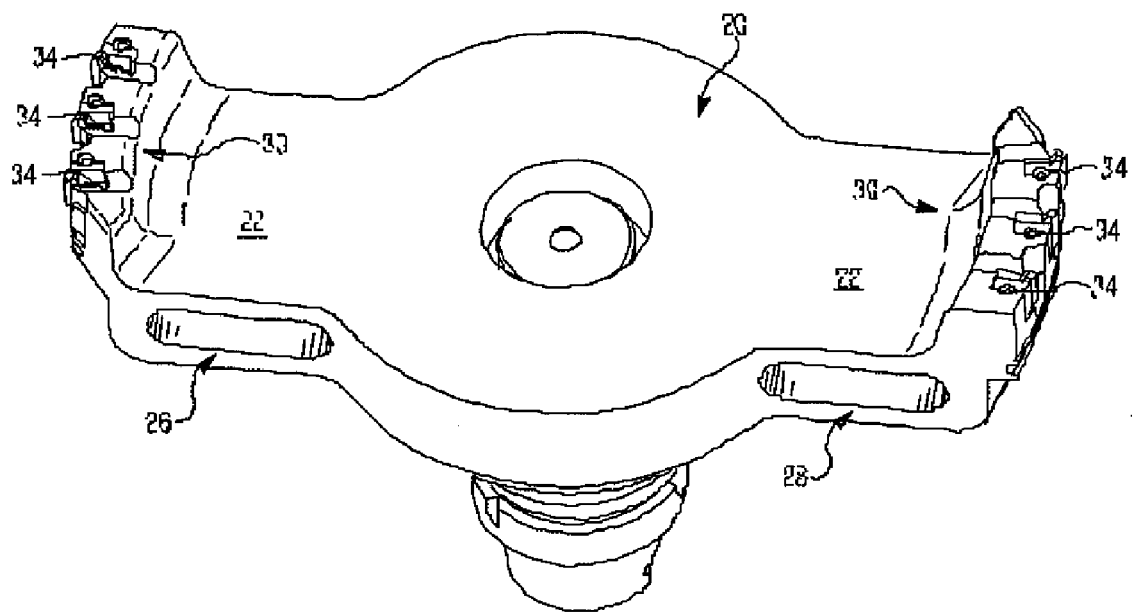
FIG. 5 shows a bottom perspective view of another exemplary embodiment of a rotary material removal tool.

FIGS. 4 and 5 show exemplary embodiments of a rotary material removal tool, with FIG. 4 being a top perspective view and FIG. 5 being a bottom perspective view. The rotary material removal tool 10 comprises a shaft 12 having a first axis 14 and body 16 including a top side 18, a bottom side 20 and a plurality of radially extending arms 22. The top side 18 of the body 16 is mounted to a first end of the shaft for rotational motion of the body 16 about the first axis 14. In this regard, to minimize imbalances and other deleterious effects at high rotation speeds, the body is substantially balanced by mass relative to the axis of rotation.

Each arm 22 includes a radially outward peripheral edge 24, and, relative to a direction of rotational motion (M) of the body 16, a leading side 26 and a trailing side 28. The radially outward peripheral edge 24 includes a cutting insert mounting structure 30 that projects axially below the bottom side 20 of the body 16. Example features of the cutting insert mounting structure 30 include one or, preferably, a plurality of pockets 32 for cutting inserts 34. Conventional features to mount the cutting insert 34 in the pocket 32 and/or to improve machining operation can be included as needed, such as a spacer, a mounting screw, an adjustment device and flutes or chipways to direct residue from the machining operation away from the cutting zone.

In general theory, the level of noise is described by decibels (dB):

$$dB = 20 \log(P_1/P_0) \quad \text{Eq. 1}$$

By the definition, dB is ratio of measured air pressure ($P_1$) to the reference air pressure ($P_0$). Typically, $P_0$=20 μPa or "base" pressure ($2.9e^{-9}$ psi) which correlates to the auditory threshold at 1 kHz, i.e., threshold of hearing is generally reported as the RMS sound pressure of 20 μPa (micropascals).

On conventional rotating tools, the leading surfaces of the rotating parts encounter air friction and force themselves through the air medium. Further, this interaction between the leading surfaces of the rotating parts and the air medium displaces large amounts of air and changes the air pressure at different locations relative to the rotating tool. The changes in air pressure associated with air flow above and below the rotating parts cause axial movement of the tool surfaces and changes in air pressure associated with air flow to the side of the rotating parts cause radial movement of the tool surfaces. These changes in air pressure increase the noise associated with machining operations and the resulting axial and radial oscillation of the rotating tool result in machining errors, such as non-flat surfaces and/or out of tolerance dimensions. In addition, in many cases air pressure can oscillate the part like a diaphragm depending on the material stiffness and thinness of the part. For example, valve bodies are very flexible and susceptible to oscillations from air pressure. Thus, a combination of tool movement and part movement can be present and depending, on the individual cases, either movement might dominate. To reduce the noise, disclosed herein are features of a rotary material removal that reduce measured air pressure ($P_1$). In this regard, exemplary embodiments of the disclosed rotary material removal tool 10 include at least a portion of the leading edge and/or leading side of rotating portions of the body 16 are shaped to improve the displacement of air, i.e., by splitting of air and/or directing of air, as the rotary material removal tool 10 rotates.

In an exemplary embodiment, the projection of the cutting insert mounting structure 30 below the bottom side 20 of the body 16 provides an increased volume of space between bottom side 20 of the body 16 of the rotary material removal tool 10 and the part and contributes to reducing the compression of air by the rotary material removal tool 10. As shown in FIG. 4, the bottom side 20 of the body 16 is spaced from a plane (P) containing a bottommost surface of the projecting cutting insert mounting structure 30 by a distance (D). As the value of the distance (D) increases, the volume of air that can be accommodated below the rotary material removal tool 10 increases resulting in reduced measured air pressure ($P_1$). As a consequence of reduced measured air pressure ($P_1$), the decibels (dB) are reduced (see, Eq. 1). An example of a distance (D) is about 25 mm or greater.

Figure 6:
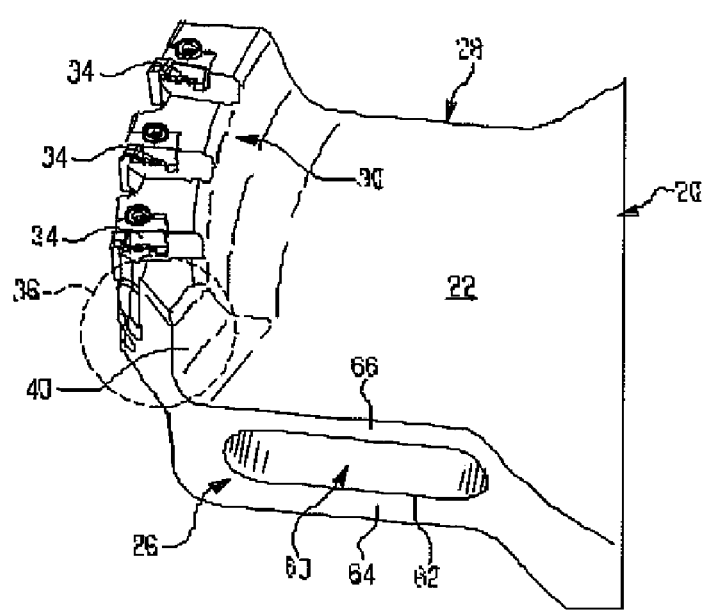
FIG. 6 shows a magnified perspective view of an exemplary embodiment of the leading edge of the insert mounting structure from FIG. 5.

In another exemplary embodiment, a leading edge 36 of the insert mounting structure 30 includes an air-displacement structure shaped to improve splitting of air as the rotary material removal tool rotates. FIG. 6 shows in perspective view a leading edge 36 of the insert mounting structure 30 where the air-displacement structure has a shape of a tapered structure 40.

In addition to the tapered structure 40 at the leading edge 36 of the insert mounting structure 30, the leading edge 42 of the radially outward peripheral edge 24 itself can include an air-displacement structure. In the rotary material removal tool illustrated in FIG. 4, a region 44 of the leading edge 42 of the radially outward peripheral edge 24 is shown having a tapered structure. The shape of the taper of this region 44 can be, in some exemplary embodiments, an extension of and correlate with the shape of the leading edge 36 of the insert housing structure 40, although other tapered angles and tapered shapes can be use, both those that correlate to the tapered structure 40 of the leading edge 36 of the insert mounting structure 30 and those that do not correlate. Thus and for example, where the shape of the leading edge 36 of the insert mounting structure 30 is a tapered structure 40, the shape of the tapered structure 40 extends onto and correlates with the shape of the taper of this region 44.

Figure 7:
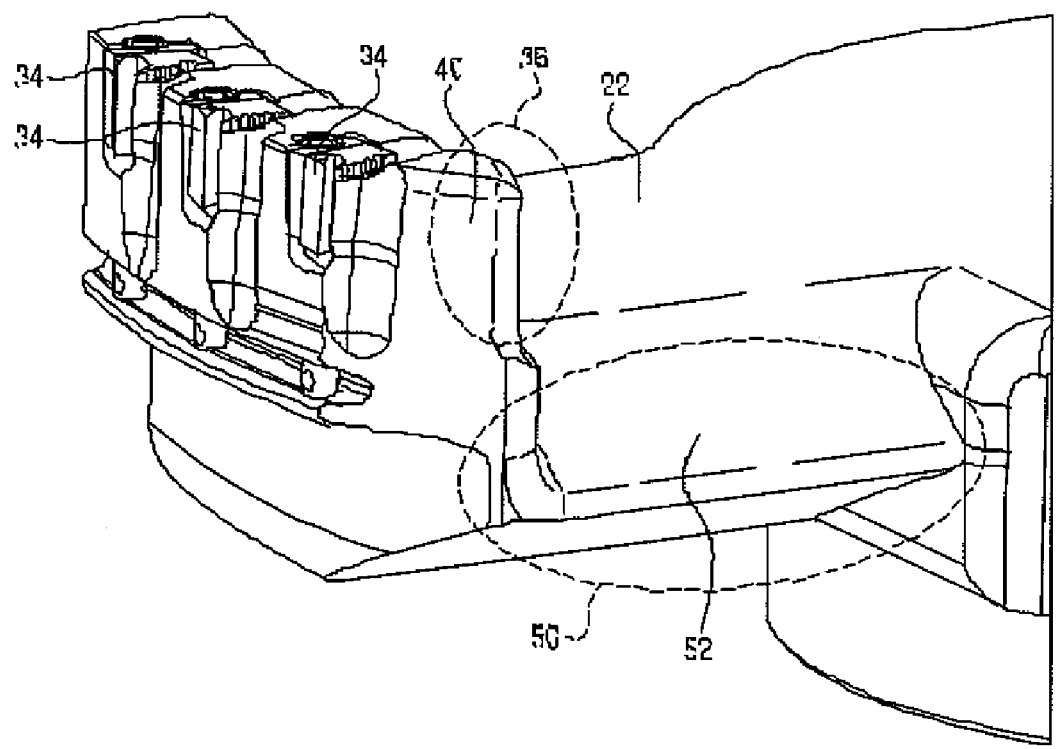
FIG. 7 shows a magnified perspective view of a further exemplary embodiment of a rotary material removal illustrating an aerodynamic structure on a leading side of the arms.

Other leading surfaces and leading edges of the various parts of the body 16 of the rotary material removal tool 10 can incorporate air-displacement structures and shapes to improve the aerodynamic flow of air across the leading edges, i.e., relative to a planar surface oriented perpendicular to the impacting air flow, as the rotary material removal tool 10 rotates. For example and as shown in FIG. 7, at least a portion 50 of an edge or surface of the leading side 26 includes an air-displacement structure. Here, the air-displacement structure includes a tapered structure 52, but other suitable air-displacement structures can be used as long as the shape improves the aerodynamic flow of air and reduces measured air pressure ($P_1$).

In a further example, to reduce measured air pressure ($P_1$), exemplary embodiments of the disclosed rotary material removal tool 10 can include at least one through-opening in the radially extending arms 22 of the body 16, where the through-opening extends from the leading side 26 of the arm 22 to the trailing side 28 of the arm 22. The feature of the through-opening in the arms can be utilized alone or in combination with the feature of the air-displacement structures of the leading sides and/or edges. Similarly, the feature of the air-displacement structure of the leading sides and/or edges can be utilized alone or in combination with the feature of the through-opening in the arms.

Generally, each of the arms 22 includes a through-opening 60 to balance the material removal tool 10, particularly at high rotation speeds. Also generally, a number and position of through-openings in each radially extending arm are symmetric about the first axis 14. However, symmetry of the through openings is not required. For example, a different number or shape of the through-openings can be use. In some asymmetric examples, the airflow through the asymmetric through-openings in each arm is balanced, even though the shape and or number of the through-openings in each arm are different.

FIGS. 4-6 illustrate a first exemplary embodiment of a rotary material removal tool 10 comprising radially extending arms 22 that include at least one through-opening 60 extending from the leading side 26 to the trailing side 28. The through-opening 60 has an opening periphery edge 62 and separates the arm 22 in the region of the through-opening 60 into a first volume 64 and a second volume 66, each with their own leading face and trailing face. One or more of these leading faces can optionally and advantageously include its own air-displacement structure, such as a tapered structure.

Figure 8:
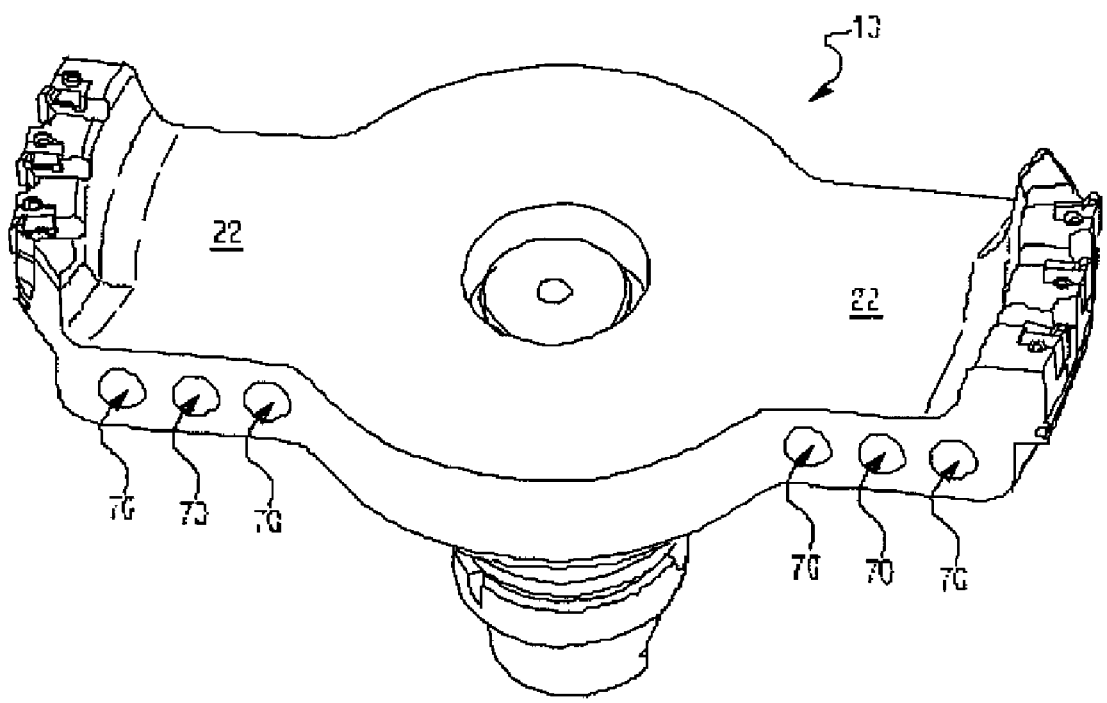
FIG. 8 shows a bottom perspective view of a still further exemplary embodiment of a rotary cutting tool illustrating a plurality of through-openings.
Figure 9:
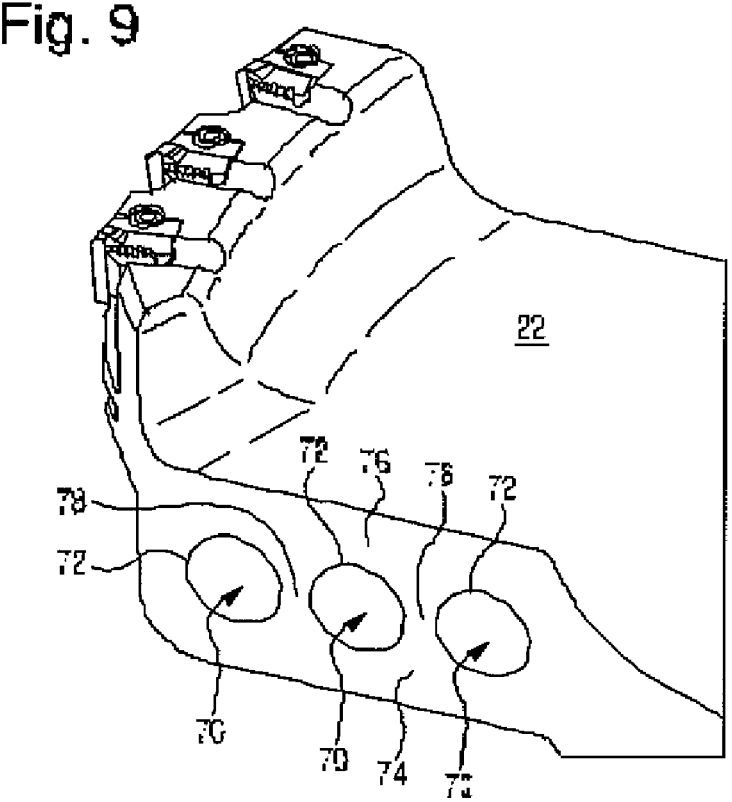
FIG. 9 shows a magnified perspective view of the exemplary embodiment of a rotary cutting tool from FIG. 8 illustrating a plurality of through-openings.
Figure 10:
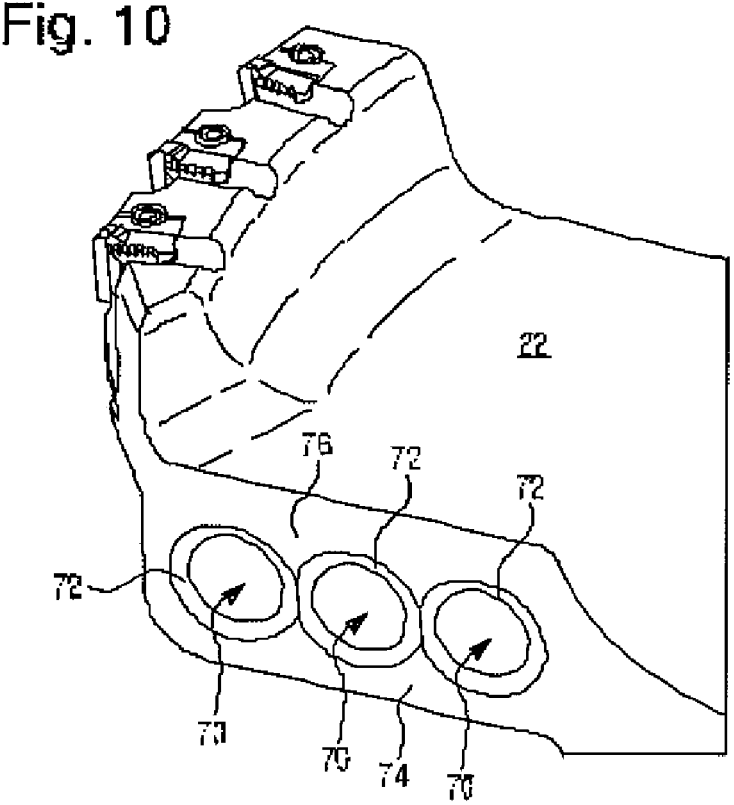
FIG. 10 shows a magnified perspective view of an additional exemplary embodiment of a rotary material removal illustrating an aerodynamic structure on a leading side of the arms.
Figure 11:
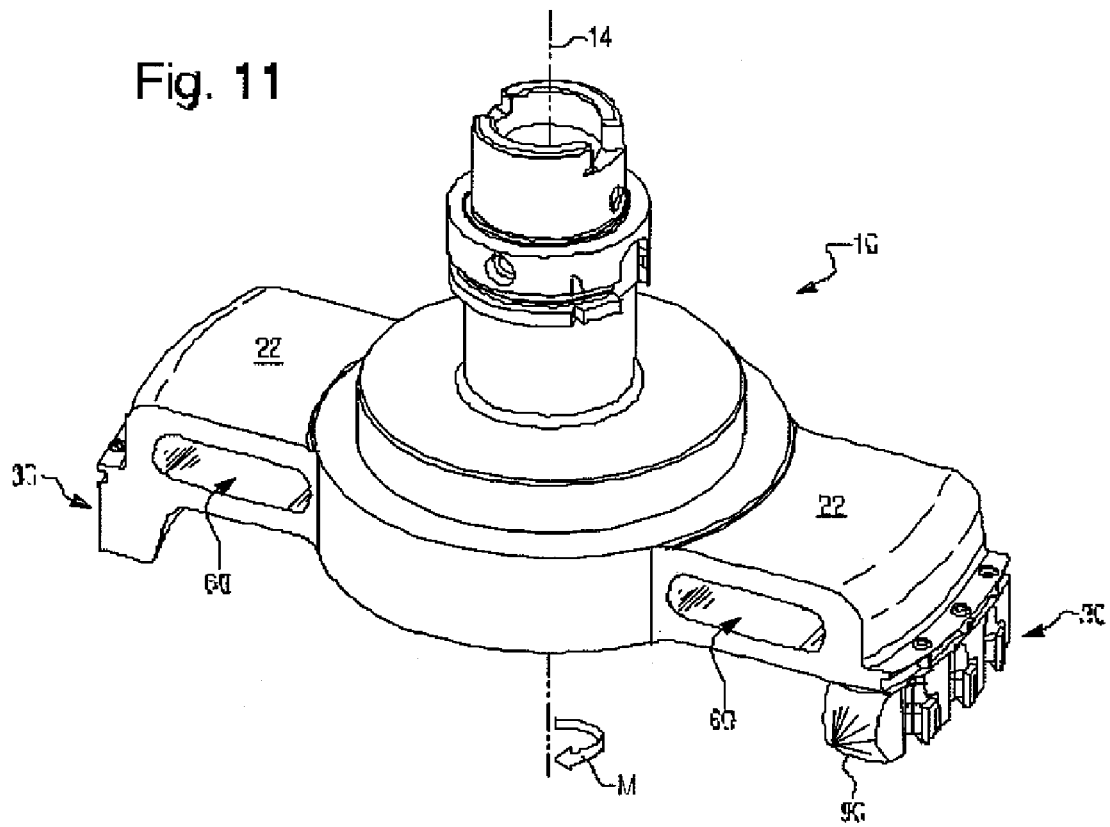
FIG. 11 shows a top perspective view of an exemplary embodiment of a rotary material removal tool with a separate structure that is joined to the insert mounting structure.
Figure 12:
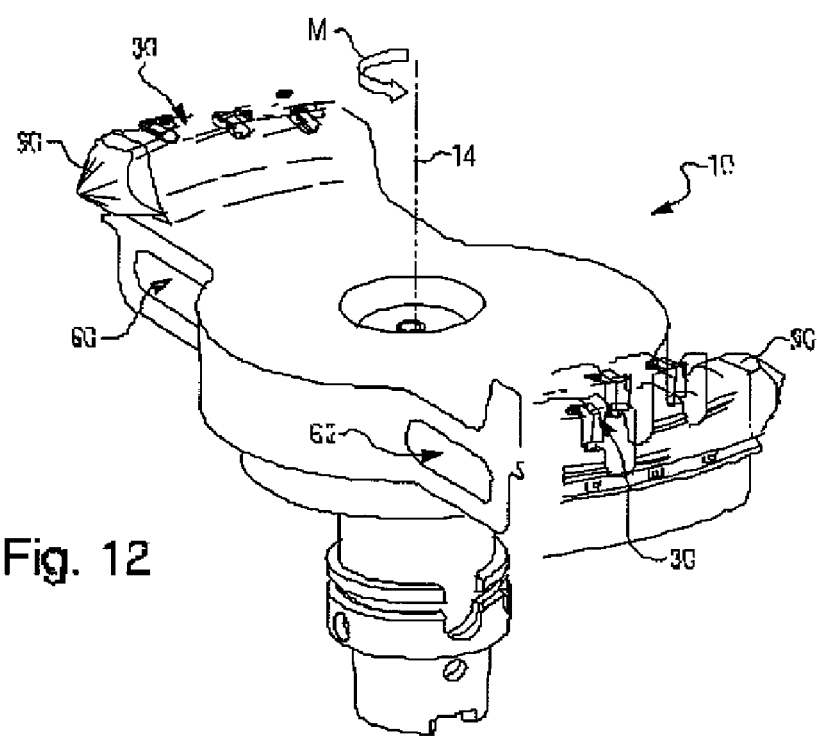
FIG. 12 shows a bottom perspective view of the exemplary embodiment of a rotary material removal tool from FIG. 11.
Figure 13:
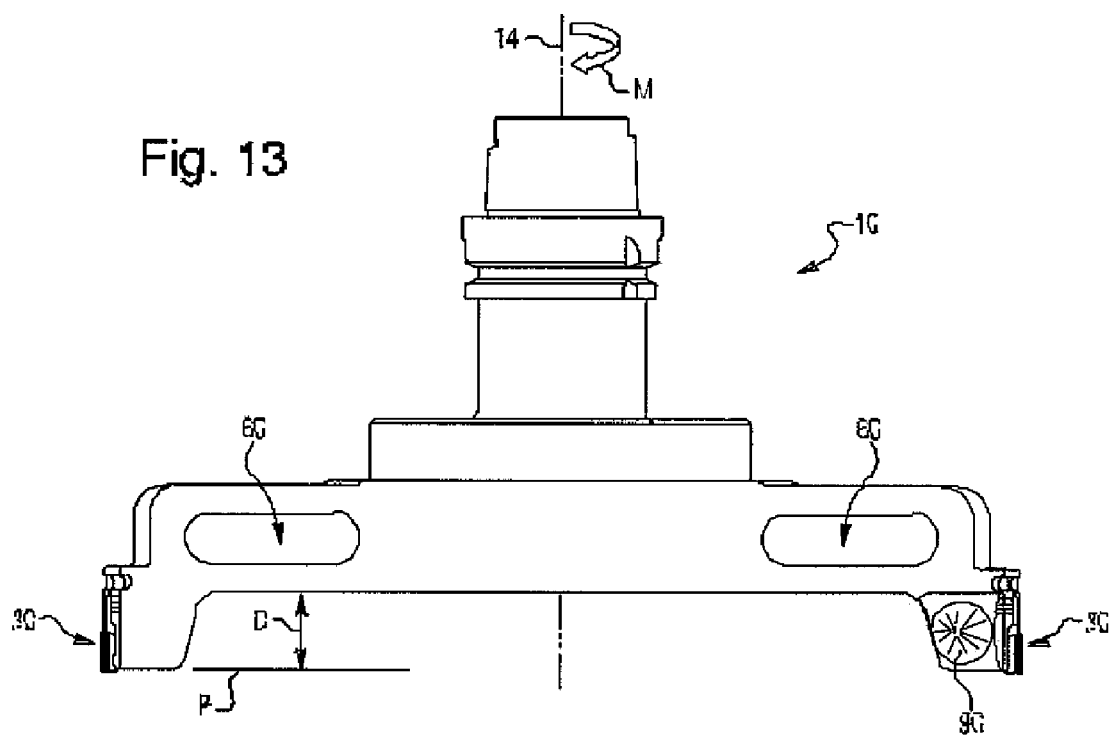
FIG. 13 shows a side elevation view of an exemplary embodiment of a rotary material removal tool with a separate structure that is joined to the insert mounting structure.
Figure 14:
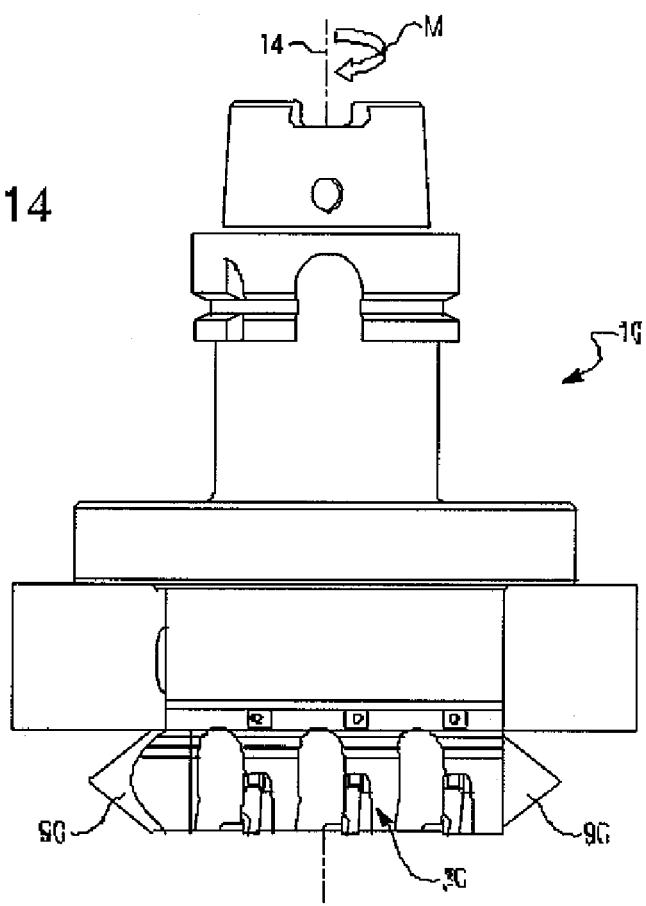
FIG. 14 shows another side elevation view of the exemplary embodiment of a rotary material removal tool that is rotated 90° from the view shown in FIG. 12.
Figure 15:
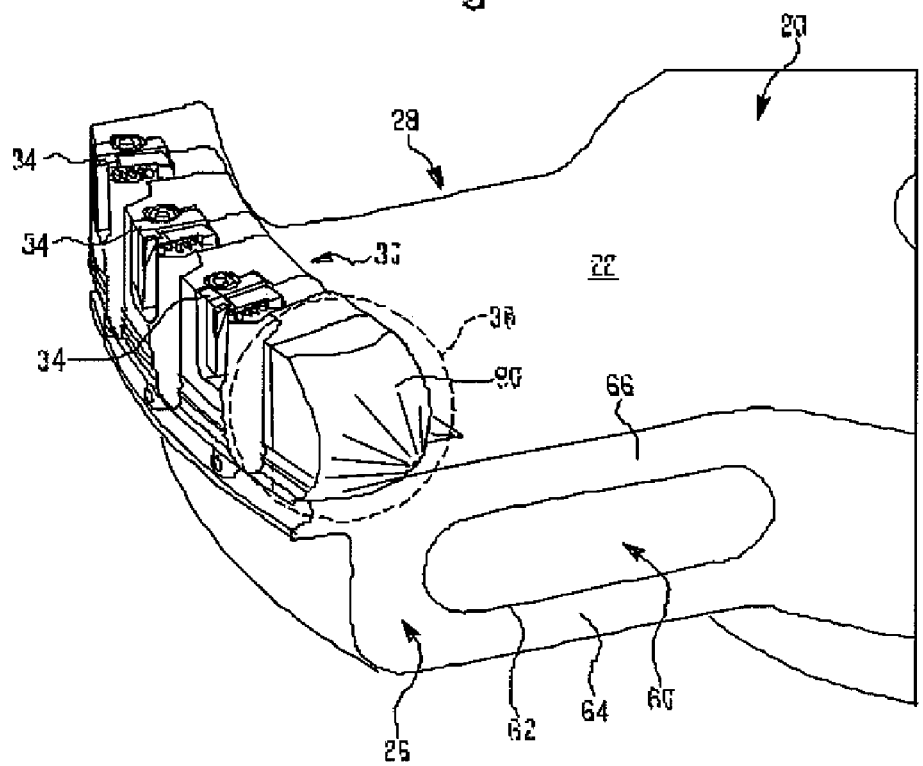
FIG. 15 shows a magnified perspective view of an exemplary embodiment of the leading edge of the insert mounting structure from FIGS. 11-14.

Other examples of through-openings are illustrated in FIGS. 8 and 9. Here, the arms 22 include a plurality of through-openings 70. The plurality of through-openings 70 each have an opening periphery edge 72 and collectively separates the arm 22 in the region of the through-openings 70 into a first volume 74 and a second volume 76, each with their own leading face and trailing face. Further, there is a separating volume 78 between sequentially positioned through-openings 70 with their own leading face and trailing face. One or more or all of these leading faces can optionally and advantageous include its own air-displacement structure, such as rounded edging as shown in FIG. 10 or a tapered structure 80. Any one or more of the periphery edges 72, the first volume 74, the second volume 76 and the separating volume 78 can include an air-displacement structure as long as the shape improves the aerodynamic flow of air past the edges and volumes. Also note in FIG. 10 that the inlets to the through-openings 70 are flared open and widened as compared to those in FIG. 9 to improve the aerodynamic structure of the edges 72 to reduce the measured air pressure ($P_1$).

In alternative embodiments, the through-openings 60,70 can be replaced partially or wholly by slots in the bottom side 20 of the body 16 in the area of the radially extending arms 22.

In some illustrated embodiments, such as, e.g., in FIGS. 4-9, the air-displacement structure, such as the tapered structure 40, is integrally formed with the insert mounting structure 30. However, the air-displacement structure can alternatively be a separate structure that is joined to the insert mounting structure 30, for example, by mechanical fasteners, chemical fasteners or metallurgical fasteners, or a combination of such fasteners. FIGS. 11-15 illustrates such a separate air-displacement structure 90.

Both integral air-displacement structures and separate air-displacement structures that are joined to the rotary material removal tool can be used on the edges of the leading sides, both when through-openings are provided in the arms and when the arms do not have any through-openings. Further, it is not required that the entire leading side or leading face, or any edges associated therewith, incorporates the suitable air-displacement structure. Rather, only portions of the leading side or leading face can incorporate such air-displacement structures, if desired.

One use of separate air-displacement structures includes retrofitting prior rotary material removal tools with the separate air-displacement structure. In this regard, a surface of the leading side of the peripheral edge of an existing rotary material removal tool can be cut or ground to provide a mounting surface to which is fastened a separate air-displacement structure by any suitable fastening means, such as mechanical fasteners, chemical fasteners or metallurgical fasteners, or a combination of such fasteners.

Figure 16A:
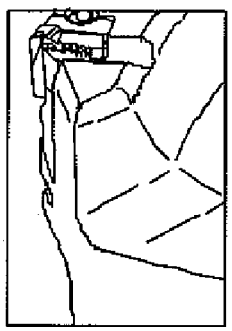
FIGS. 16A-C show perspective views of examples of tapered structures.
Figure 16B:
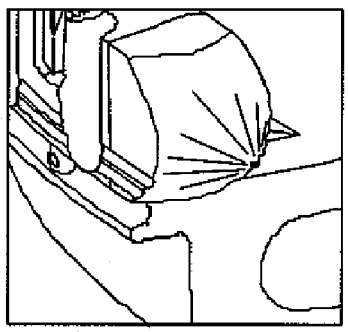
Figure 16C:
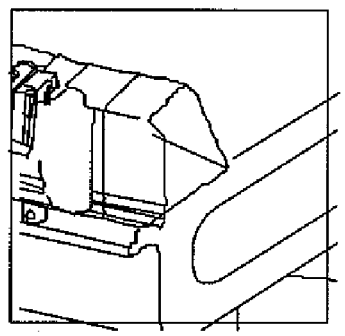

Examples of air-displacement structures are shown in FIGS. 16A-C in perspective views. These examples include a tapered structure that is generally wedge-shaped (FIG. 16A), a tapered structure that is generally cone-shaped (FIG. 16B) and a tapered structure that is generally pyramid-shaped (FIG. 16C). Other suitable shapes can be used for the air-displacement structure are those shapes that provide an aerodynamic effect to the rotary material removal tool to reduce the measured air pressure ($P_1$).

Figure 17:
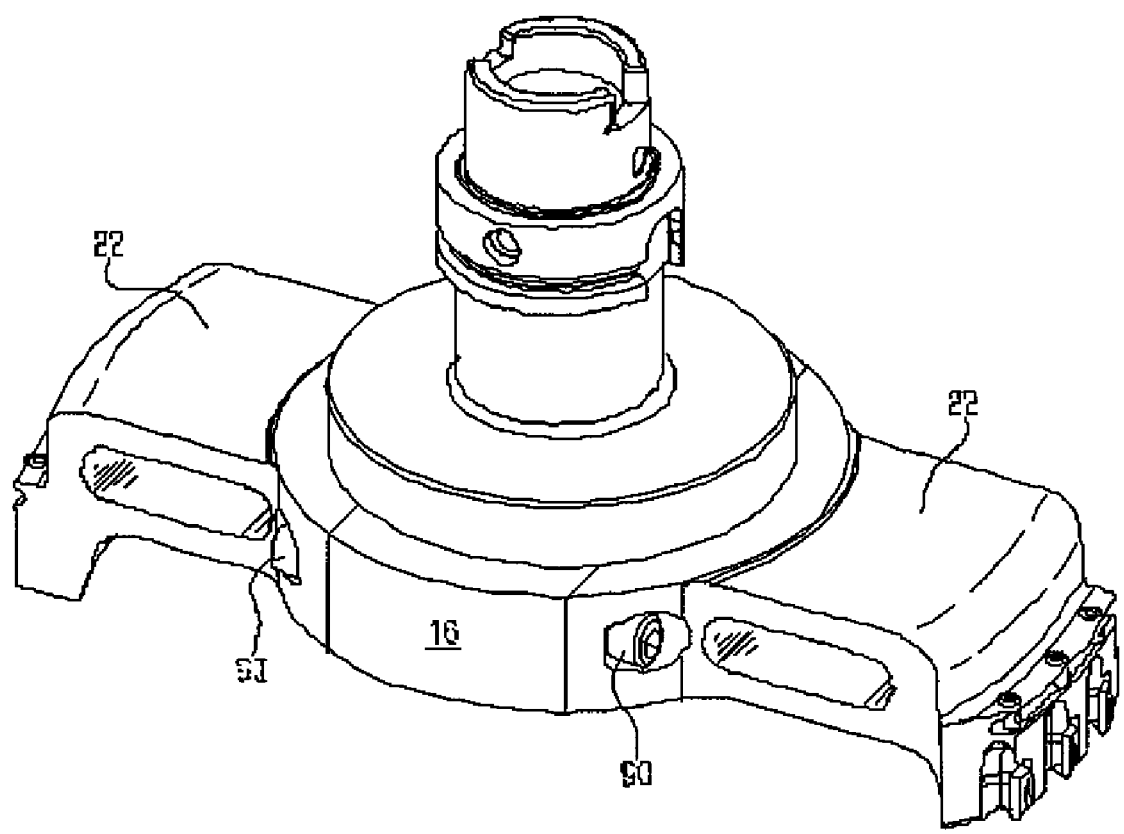
FIG. 17 illustrates an example of a rotary material removal tool with radially extending arms as separate structures joined to the body by mechanical fasteners.

The radially extending arms 22 can be formed in one integral piece with the other portions of the body 16, for example, by machining or by rough forging followed by finish machining, or the radially extending arms 22 can be separate structures that are joined to the body 16, for example, by mechanical fasteners, chemical fasteners or metallurgical fasteners, or a combination of such fasteners. In an exemplary embodiment, the radially extending arms 22 are formed in one integral piece with the other portions of the body 16 by machining. In another exemplary embodiment, the radially extending arms 22 are separate structures joined to the body 16 by mechanical fasteners, such as a threaded fastener. FIG. 17 illustrates an example of radially extending arms 22 as separate structures joined to the body 16 by mechanical fasteners 90.

Generally, the axially extending shaft 12 includes a mating end 100 distal from first end of the shaft 14. The mating end 100 includes a connector 102 that interfaces with and attaches to a machine tool, such as a HAAS VF6 milling machine, for operation. The connector 102 can take any suitable form that allows attachment to a desired machine tool. Optionally, the connector 102 has a transition piece 104. An example of a transition piece 104 includes at least one feature for mating to a machine tool or to a storage system. For example, the transition piece 104 can include a circumferential groove 106. The circumferential groove 106, or similar structure, can provide an attachment point for mating the material removal tool 10 to a carousel storage system used in machining operations to store multiple material removal tools, as well as is suitable for automatic toll change. In another example, the connector 102 can include a key slot 108. The key slot 108, or similar structure, can provide an orientation or a mating with a corresponding feature on the machine tool when the material removal tool 10 is mounted for use.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A rotary material removal tool, comprising:
    a shaft having a first axis; and
    a body including a top side, a bottom side and a plurality of radially extending arms, the top side mounted to a first end of the shaft for rotational motion of the body about the first axis,
    wherein each arm includes a radially outward peripheral edge, and, relative to a direction of rotational motion of the body, a leading side and a trailing side,
    wherein the radially outward peripheral edge includes a cutting insert mounting structure that projects axially below the bottom side of the body, and
    wherein at least one of (i) a leading edge of the insert mounting structure includes an air-displacement structure, (ii) the radially extending arms include at least one through-opening extending from the leading side to the trailing side, and (iii) the bottom side of the body is spaced from a plane containing a bottommost surface of the projecting cutting insert mounting structure.

2. The rotary material removal tool according to claim 1, wherein the leading edge of the insert mounting structure includes the air-displacement structure and wherein the radially extending arms include at least one through-opening extending from the leading side to the trailing side.

3. The rotary material removal tool according to claim 1, wherein the rotary material removal tool includes (i) a leading edge of the insert mounting structure includes an air-displacement structure, (ii) the radially extending arms include at least one through-opening extending from the leading side to the trailing side, and (iii) the bottom side of the body is separated from a plane containing a bottommost surface of the projecting cutting insert mounting structure.

4. The rotary material removal tool according to claim 3, wherein each radially extending arm includes a plurality of through-openings.

5. The rotary material removal tool according to claim 4, wherein a number and position of through-openings in each radially extending arm are symmetric about the first axis.

6. The rotary material removal tool according to claim 1, wherein each radially extending arm includes a plurality of through-openings.

7. The rotary material removal tool according to claim 6, wherein a number and position of through-openings in each radially extending arm are symmetric about the first axis.

8. The rotary material removal tool according to claim 1, wherein a shape of the air-displacement structure included on the leading edge of the insert mounting structure is a tapered structure.

9. The rotary material removal tool according to claim 8, wherein the tapered structure is generally wedge-shaped, is generally cone-shaped or is generally pyramid-shaped.

10. The rotary material removal tool according to claim 1, wherein a leading edge of the radially outward peripheral edge includes an air-displacement structure.

11. The rotary material removal tool according to claim 10, wherein a shape of the air-displacement structure included on the leading edge of the radially outward peripheral edge is a tapered structure.

12. The rotary material removal tool according to claim 11, wherein the tapered structure is generally wedge-shaped, is generally cone-shaped or is generally pyramid-shaped.

13. The rotary material removal tool according to claim 10, wherein a shape of the air-displacement structure included on the leading edge of the radially outward peripheral edge extends onto the leading edge of the radially outward peripheral edge.

14. The rotary material removal tool according to claim 1, wherein at least a portion of an edge of the leading side includes an air-displacement structure.

15. The rotary material removal tool according to claim 14, wherein the shape of the air-displacement structure included on the edge of the leading side is a tapered structure.

16. The rotary material removal tool according to claim 15, wherein the tapered structure is generally wedge-shaped, is generally cone-shaped or is generally pyramid-shaped.

17. The rotary material removal tool according to claim 1, wherein at least a portion of a leading edge or leading side of rotating portions of the body includes an air-displacement structure.

18. The rotary material removal tool according to claim 1, wherein at least a portion of an edge of the through-opening on the leading side includes an air-displacement structure.

19. A method of machining a workpiece, the method comprising:
    removing material from the workpiece with a material removal tool,
    wherein the material removal tool includes a shaft having a first axis, and a body having a top side, a bottom side and a plurality of radially extending arms, the top side mounted to a first end of the shaft for rotational motion of the body about the first axis,
    wherein each arm includes a radially outward peripheral edge, and, relative to a direction of rotational motion of the body, a leading side and a trailing side,
    wherein a radially outward peripheral edge includes a cutting insert mounting structure that projects axially below the bottom side of the body, and
wherein at least one of (i) a leading edge of the insert mounting structure includes an air-displacement structure, (ii) the radially extending arms include at least one through-opening extending from the leading side to the trailing side, and (iii) the bottom side of the body is spaced from a plane containing a bottommost surface of the projecting cutting insert mounting structure.

20. The method of claim 19, wherein the method produces a valve body.

* * * * *